United States Patent
Nair et al.

(10) Patent No.: US 12,346,361 B2
(45) Date of Patent: Jul. 1, 2025

(54) HIERARCHICAL SEGMENTATION OF UNSTRUCTURED TEXT USING NEURAL NETWORKS

(71) Applicant: Adobe Inc., San Jose, CA (US)

(72) Inventors: Inderjeet Nair, Ann Arbor, MI (US); Sumit Shekhar, Bengaluru (IN); Srikrishna Karanam, Bangalore (IN); Niyati Himanshu Chhaya, Hyderabad (IN); Natwar Modani, Bangalore (IN); Balaji Vasan Srinivasan, Bangalore (IN); Aparna Garimella, Hyderabad (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/511,186

(22) Filed: Nov. 16, 2023

(65) Prior Publication Data
US 2025/0165517 A1 May 22, 2025

(51) Int. Cl.
*G06F 16/00* (2019.01)
*G06F 16/31* (2019.01)
*G06F 16/34* (2019.01)

(52) U.S. Cl.
CPC .......... *G06F 16/345* (2019.01); *G06F 16/322* (2019.01)

(58) Field of Classification Search
CPC .............................. G06F 16/345; G06F 16/322
See application file for complete search history.

(56) References Cited

U.S. PATENT DOCUMENTS

| 5,708,825 A | * | 1/1998 | Sotomayor | ............. G06F 40/30 707/E17.094 |
| 8,196,030 B1 | * | 6/2012 | Wang | ..................... G06V 30/40 715/251 |

(Continued)

FOREIGN PATENT DOCUMENTS

| AU | 2013205175 B2 | * | 12/2015 | ............. G06F 16/93 |
| CN | 107145479 A | * | 9/2017 | ............. G06F 40/14 |

(Continued)

OTHER PUBLICATIONS

Al et al., "CN-113157907-A" English translation,pp. 1-17 (Year: 2021).*

(Continued)

*Primary Examiner* — Alexander Khong
(74) *Attorney, Agent, or Firm* — Nicholson De Vos Webster & Elliott LLP

(57) ABSTRACT

Embodiments are disclosed for a digital design system trained to segment unstructured text into topically coherent segments. The method may include receiving unstructured text, the unstructured text including a sequence of sentences. The disclosed systems and methods further comprise generating, by a neural network, a hierarchically segmented tree structure representing the unstructured text. The tree structure comprises a plurality of tree structure nodes, where a node of the tree structure nodes represents a sentence from the sequence of sentences. The segments and sub-segments of the unstructured text can then be determined based on node data for nodes of the hierarchically segmented tree structure. Using the determined segments and sub-segments of the unstructured text, a modified representation of the unstructured text can be displayed.

20 Claims, 9 Drawing Sheets

(56) References Cited

U.S. PATENT DOCUMENTS

| | | | | |
|---|---|---|---|---|
| 2003/0187642 | A1* | 10/2003 | Ponceleon | G10L 15/1822 |
| | | | | 704/252 |
| 2021/0232750 | A1* | 7/2021 | Gray | G06F 40/106 |
| 2024/0220525 | A1* | 7/2024 | Baird | G06F 40/40 |
| 2024/0289366 | A1* | 8/2024 | Hranj | G06F 16/345 |

FOREIGN PATENT DOCUMENTS

| | | | | | |
|---|---|---|---|---|---|
| CN | 113157907 | A | * | 7/2021 | G06F 16/345 |
| CN | 114841162 | B | * | 1/2024 | G06F 16/35 |
| CN | 112771607 | B | * | 7/2024 | G06F 3/167 |

OTHER PUBLICATIONS

Bao et al., "CN-107145479-A" English translation, pp. 1-6 (Year: 2017).*

Arnold et al., "Sector: A Neural Model for Coherent Topic Segmentation and Classification", Transactions of the Association for Computational Linguistics, vol. 7, Apr. 2019, pp. 169-184.

Badjatiya et al., "Attention-based Neural Text Segmentation", arXiv:1808.09935v1 [cs.LG], Aug. 29, 2018, 13 pages.

Barrow et al., "A Joint Model for Document Segmentation and Segment Labeling", Proceedings of the 58th Annual Meeting of the Association for Computational Linguistics, Jul. 5-10, 2020, pp. 313-322.

Beeferman et al., "Statistical Models for Text Segmentation", Machine Learning 34, 1999, pp. 177-210.

Bentabet et al., "Automatic Table-of-Contents Generation for Efficient Information Access", SN Computer Science, vol. 1, Art. 283, Aug. 27, 2020, 17 pages.

Blei et al., "Topic Segmentation with an Aspect Hidden Markov Model", Proceedings of the 24th Annual International ACM SIGIR Conference on Research and Development in Information Retrieval (SIGIR '01), 2001, pp. 343-348.

Choi, F.Y.Y., "Advances in domain independent linear text segmentation", arXiv:cs/0003083v1 [cs.CL], Mar. 30, 2000, 8 pages.

Du et al., "Topic Segmentation with a Structured Topic Model", Proceedings of NAACL-HLT, Jun. 9-14, 2013, pp. 190-200.

Eisenstein et al., "Bayesian Unsupervised Topic Segmentation", Proceedings of the 2008 Conference on Empirical Methods in Natural Language Processing, Oct. 2008, pp. 334-343.

Fragkou et al., "A Dynamic Programming Algorithm for Linear Text Segmentation", Journal of Intelligent Information Systems 23, 2004, 19 pages.

Glavas et al., "Unsupervised Text Segmentation Using Semantic Relatedness Graphs", Proceedings of the Fifth Joint Conference on Lexical and Computational Semantics, Aug. 11-12, 2016, pp. 125-130.

Gu et al., "Domain-Specific Language Model Pretraining for Biomedical Natural Language Processing", arXiv:2007.15779v6 [cs.CL], Sep. 16, 2021, 24 pages.

Hearst, M. A. "TextTiling: Segmenting Text into Multi-paragraph Subtopic Passages", Computational Linguistics, vol. 23, No. 1, 1997, 32 pages.

Kazantseva et al., "Linear Text Segmentation Using Affinity Propagation", Proceedings of the 2011 Conference on Empirical Methods in Natural Language Processing, , Jul. 27-31, 2011, pp. 284-293.

Koshorek et al., "Text Segmentation as a Supervised Learning Task", arXiv:1803.09337v1 [cs.CL], Mar. 25, 2018, 5 pages.

Lafferty et al., "Conditional Random Fields: Probabilistic Models for Segmenting and Labeling Sequence Data", ICML, 2001, 28 pages.

Lari et al., "The estimation of stochastic context-free grammars using the Inside-Outside algorithm", Computer Speech and Language, vol. 4, 1990, pp. 35-56.

Li et al., "SEGBOT: A Generic Neural Text Segmentation Model with Pointer Network", Proceedings of the 27th International Joint Conference on Artificial Intelligence, IJCAI-18, Jul. 2018, pp. 4166-4172.

Liu et al., "A Robustly Optimized BERT Pre-training Approach with Post-training", Proceedings of the 20th China National Conference on Computational Linguistics, Aug. 13-15, 2021, pp. 1218-1227.

Lo et al., "Transformer over Pre-trained Transformer for Neural Text Segmentation with Enhanced Topic Coherence", arXiv:2110.07160v1 [cs.CL], Oct. 14, 2021, 7 pages.

Lukasik et al., "Text Segmentation by Cross Segment Attention", arXiv:2004.14535v2 [cs.CL], Dec. 7, 2020, 10 pages.

Mahapatra et al., "Automatic Hierarchical Table of Contents Generation for Educational Videos", Track: Cognitive Computing, Apr. 23-27, 2018, pp. 267-274.

Malioutov et al., "Making Sense of Sound: Unsupervised Topic Segmentation over Acoustic Input", Proceedings of the 45th Annual Meeting of the Association of Computational Linguistics, 2007, pp. 504-511.

McFee et al., "Evaluating Hierarchical Structure in Music Annotations", Frontiers in Psychology, vol. 8, Art. 1337, Aug. 2017, 17 pages.

Pevzner et al., "A Critique and Improvement of an Evaluation Metric for Text Segmentation", Computational Linguistics, vol. 28, No. 1, 2002, 18 pages.

Purver et al., "Unsupervised Topic Modelling for Multi-Party Spoken Discourse ", Proceedings of the 21st International Conference on Computational Linguistics and 44th Annual Meeting of the ACL, Jul. 2006, pp. 17-24.

Stern et al., "A Minimal Span-Based Neural Constituency Parser", arXiv:1705.03919v1 [cs.CL], May 10, 2017, 10 pages.

Utiyama et al., "A Statistical Model for Domain-Independent Text Segmentation", Proceedings of the 39th Annual Meeting of the Association for Computational Linguistics, 2001, 8 pages.

Vaswani et al., "Attention Is All You Need", 31st Conference on Neural Information Processing Systems (NIPS 2017), 2017, 15 pages.

Wang et al., "MINILM: Deep Self-Attention Distillation for Task-Agnostic Compression of Pre-Trained Transformers", 34th Conference on Neural Information Processing Systems, 2020, 13 pages.

Zhang et al., "Fast and Accurate Neural CRF Constituency Parsing", arXiv:2008.03736v1 [cs.CL], Aug. 9, 2020, 8 pages.

* cited by examiner

HIERARCHICAL SEGMENTATION OF UNSTRUCTURED TEXT USING NEURAL NETWORKS

BACKGROUND

Reading long documents on small devices can be tedious. For knowledge workers and individuals seeking information in documents, navigating to the desired information quickly is challenging. In a well-authored document, a table of contents partially serves the goal of navigating to the desired information without having to go through the entire contents of the document. However, a significant proportion of documents such as transcripts, unstructured articles, books, memos, and emails lack a table of contents, leaving the reader without a clear understanding of the document's semantic coverage. This can increase cognitive load and make it difficult to extract relevant information.

SUMMARY

Introduced here are techniques/technologies that allow a digital design system to hierarchically segment unstructured text into topically coherent segments and sub-segments. Based on the determined segmentation of the unstructured text, the digital design system can then display a modified representation of the unstructured text In particular, a table of contents can be created using summaries and/or titles generated from the contents of the segments and sub-segments, allowing users to more easily digest the contents of the unstructured text.

More specifically, in one or more embodiments, sentences of unstructured text are provided to a pipeline of machine learning models for processing. The sentences are processed through a text encoder and a recurrent neural network to generate contextualized feature vectors representing the contents of the plurality of sentences. The contextualized feature vectors are then passed through multi-layer perceptron networks to infer a hierarchically segmented tree structure representation of the unstructured text. The hierarchically segmented tree structure is an arrangement of the sentences of the unstructured text into topically coherent segments or sub-segments, where the leaf nodes represent the sentences of the unstructured text and non-leaf nodes represent topics. Unlike works that can only identify when a topic shifts between sentences, the segments and sub-segments of the unstructured text are represented in the hierarchical tree structure from a broader or coarse-grained level by nodes closer to the root node of the hierarchical tree structure to a more specific or finer-grained level by nodes further from the root node. Using the segments and sub-segments as defined by the hierarchically segmented tree structure, the digital design system can generate different outputs. For example, a table of contents for the unstructured text can be generated by passing the sentences corresponding to the segments and sub-segments through a topic generator to generate summaries and/or titles for the segments and sub-segments.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
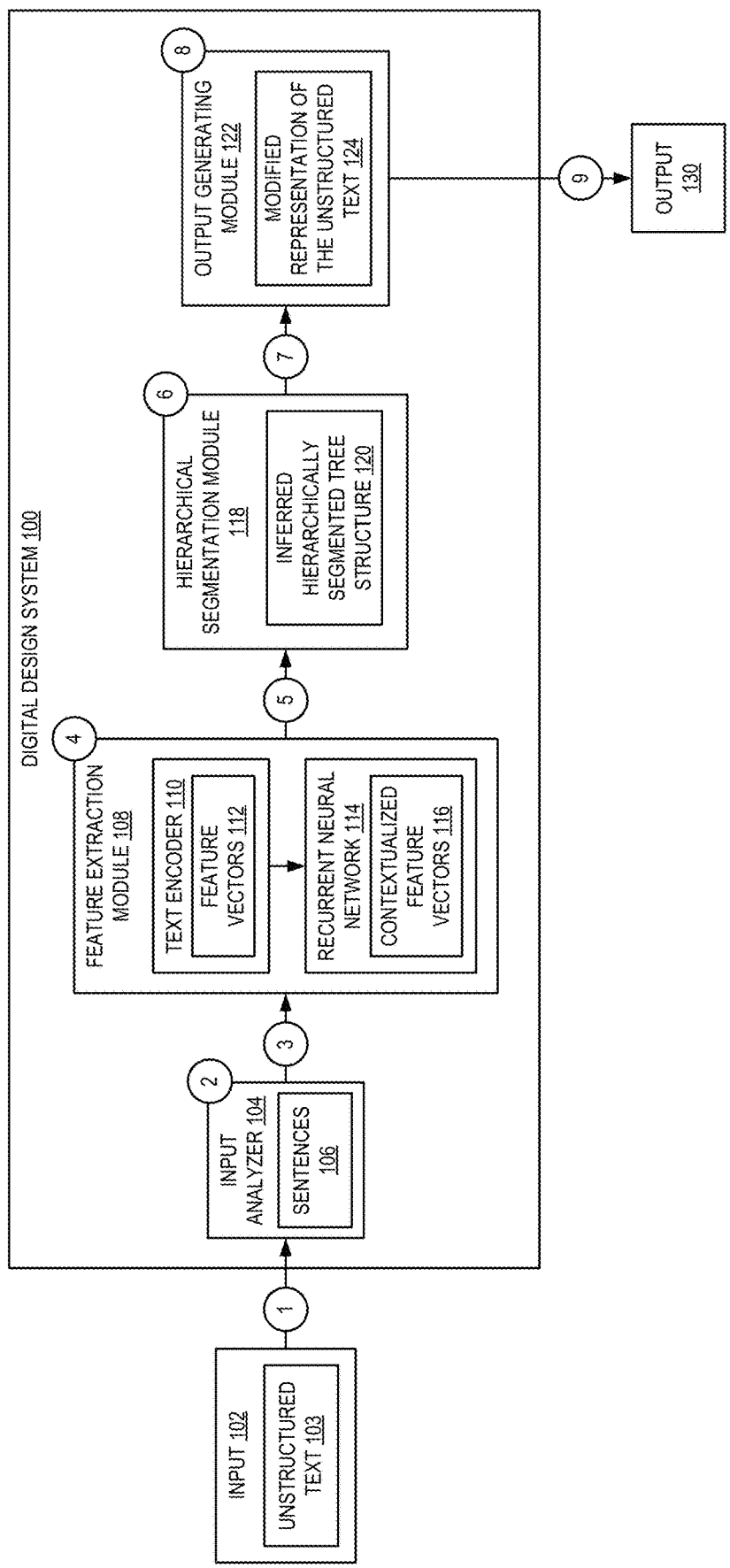
FIG. 1 illustrates a diagram of a process of segmenting unstructured text into topically coherent segments using machine learning models in accordance with one or more embodiments.

One or more embodiments of the present disclosure include a digital design system with neural networks trained to hierarchically segment sentences of unstructured text into topically coherent segments and sub-segments. Some existing solutions that perform text segmentation find segment boundaries by estimating the extent of topical shift using local cues (e.g., when the topic of one sentence changes from the topic of the immediately preceding sentence). While these methods can perform quick inference and have low memory constraints, as they only utilize local features, can only identify the boundaries where shifts in topics occur. This can result in erroneous predictions when the text includes short inconsequential digressions. For example, when a sentence that includes a digression is located within a block of sentences on a single topic, these existing solutions often erroneously create multiple segments from the block of sentences. Further, as these existing solutions only find the boundaries topic boundaries by detecting shifts in topics, they are not capable of identifying higher level topical segments and any constituent sub-segments.

To address these and other deficiencies in conventional systems, the digital design system of the present disclosure includes neural networks trained to hierarchically segment large amounts of unstructured text into topic-focused segments and sub-segments. The digital design system uses neural networks to infer a hierarchically segmented tree structure representation of input unstructured text. Hierarchical segmentation of the sentences of unstructured text produces segmentations where higher-level segmentations closer to the root node are coarser than the lower-level segmentations that are further from the root node. For example, at a highest level, all sentences are part of a single segment or broad topic. At each successive level, the sentences can be further sub-divided into finer-grained segments or sub-topics.

The digital design system of the present disclosure presents improved segmentation of unstructured text that addresses the limitations of the existing solutions. One advantage of the digital design system of the present disclosure is that by analyzing the unstructured text in a global context, segment predictions are more accurate than existing solutions that can only analyze sentence-to-sentence boundaries to find changes in topics. Further, because the hierarchical segmentation extracts topically coherent segments from coarse-grained segments to finer-grained sub-segments, the digital design system of the present disclosure can generate segmentations of varying granularity that can be used for various tasks (based on their requirements). Another advantage is that the technique enhances the user experience by allowing a user to consume text faster and in a non-linear fashion. For example, using the sentences associated with the determined segments and sub-segments, a title and/or summary can be generated to create a table of contents. This enables a user to pinpoint relevant segments more easily without having to process the entire text. In addition, the results of the hierarchical text segmentation performed by the digital design can be used to enhance the performance of downstream tasks, including text summarization, question answering, and discourse analysis, among other.

FIG. 1 illustrates a diagram of a process of segmenting unstructured text into topically coherent segments using machine learning models in accordance with one or more embodiments. As shown in FIG. 1, a digital design system 100 receives an input 102, as shown at numeral 1. For example, the digital design system 100 receives the input 102 from a user via a computing device or from a memory or storage location. In one or more embodiments, the input 102 includes at least unstructured text (e.g., unstructured text 103) that includes a plurality of sentences. For example, the input 102 can be a document or file that includes the plurality of sentences. In one or more embodiments, the input 102 can be provided in a graphical user interface (GUI). For example, the unstructured text 103 can be used to entered into a text box, or a user can indicate a storage location (e.g., on a computing device) or a URL to a location storing the unstructured text 103.

The input 102 can further include a request to perform a segmentation of the unstructured text into topically coherent segments. A goal of topical segmentation is to obtain a contiguous partition of sentences, $L=l_0, l_1, \ldots l_{k-1}$, such that joining the elements of $l_i$ in the same order reconstructs the unstructured text 103 and $l_i \cap l_j = \phi \forall i \neq j$. Each segment $l_i$ in L is associated with a topical theme. Hierarchical segmentation aims to infer a sequence of linear segmentations, $L=l_0, l_1, \ldots l_{m-1}$, where $L_i$ is coarser than $L_j$ for $i<j$. Each element of L is thus a refinement of all its preceding elements, to satisfy this coarse-to-fine grained constraint. The refinement condition for $i \leq j$ is: $\forall l \in L_j, \exists l' \in L_i : l \subseteq l'$. That is, every segment in $L_j$ is a subset of a segment in $L_i$.

The digital design system 100 includes an input analyzer 104 that receives the input 102. In some embodiments, the input analyzer 104 is configured to extract the unstructured text 103 from the input 102 and then analyze the unstructured text 103, at numeral 2. In some embodiments, the input analyzer 104 analyzes the unstructured text 103 to identify a plurality of sentences 106.

After the input analyzer 104 analyzes the unstructured text 103 to identify the plurality of sentences 106, the plurality of sentences 106 are sent to a feature extraction module 108, as shown at numeral 3. In one or more embodiments, the feature extraction module 108 include a text encoder 110 and a recurrent neural network 114. The text encoder 110 and the recurrent neural network 114 can be configured to extract feature vectors, or text embeddings, from the plurality of sentences 106, at numeral 4. In one embodiment, the text encoder 110 extracts feature vectors 112 for the plurality of sentences 106, where each sentence of the plurality of sentences 106 is represented by a feature vector of the feature vectors 112. In one or more embodiments, the text encoder 110 is a Bidirectional Encoder Representations from Transformers (BERT) encoder. The feature vectors 112 can be feature vectors that are n-dimensional vectors of numerical features that represent the plurality of sentences 106. The feature vectors 112 are then passed to a recurrent neural network 114. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

Using the feature vectors 112, the recurrent neural network 114 generates contextualized feature vectors 116 for each sentence of the plurality of sentences 106, where each contextualized feature vector corresponds to a sentence of the plurality of sentences 106. The contextualized feature vectors 116 generated by the recurrent neural network 114 consider the text features of a sentence of the plurality of sentences 106 and the text features of other sentences of the plurality of sentences 106. In one or more embodiments, the recurrent neural network 114 is a Bidirectional Long Short-Term Memory (BiLSTM) network.

After the feature extraction module 108 generates the contextualized feature vectors 116, the contextualized feature vectors 116 are sent to a hierarchical segmentation module 118, as shown at numeral 5. The hierarchical segmentation module 118 is trained to predict an inferred hierarchically segmented tree structure 120 representing the unstructured text 103. In one or more embodiments, the hierarchical segmentation module 118 uses a constituency parsing technique to generate the inferred hierarchically segmented tree structure 120, at numeral 6. The constituency parsing technique is directed to building a hierarchical tree structure where the leaf nodes correspond to the plurality of sentence 106 of the unstructured text 103. Using the constituency parsing technique, the hierarchical segmentation module 118 first determines a binarized tree structure representation of the unstructured text 103. In a binarized tree structure, each node in the binarized tree structure has at most two child nodes. After the binarized tree structure representation of the unstructured text 103 is determined, the hierarchical segmentation module 118 uses the binarized tree structure representation to generate the inferred hierarchically segmented tree structure 120.

Using the constituency parsing technique, the hierarchical segmentation module 118 analyzes the contextualized feature vectors 116 utilizing a tree-structure Conditional Random Field (CRF) to model the likelihood of a binary tree and the statistical dependencies between coarse-grained topics, or segments, and their fine-grained sub-topics, or sub-segments. The inferred hierarchically segmented tree structure 120 is a representation of the unstructured text 103 where each leaf node of the tree represents a sentence of the plurality of sentences 106, and each node (other than the leaf nodes) represents a topical theme based on all the leaf nodes descended from the node. Thus, sibling nodes (e.g., nodes with a same direct parent node) represent sentences from the plurality of sentences 106 that are topically related. At higher levels of the tree (e.g., closer to the root node), the topical relation between sentences represented by sibling nodes is more general or coarse-grained, while the topical relation between sentences represented by sibling nodes is more specific or finer-grained at lower levels of the tree.

Figure 2:
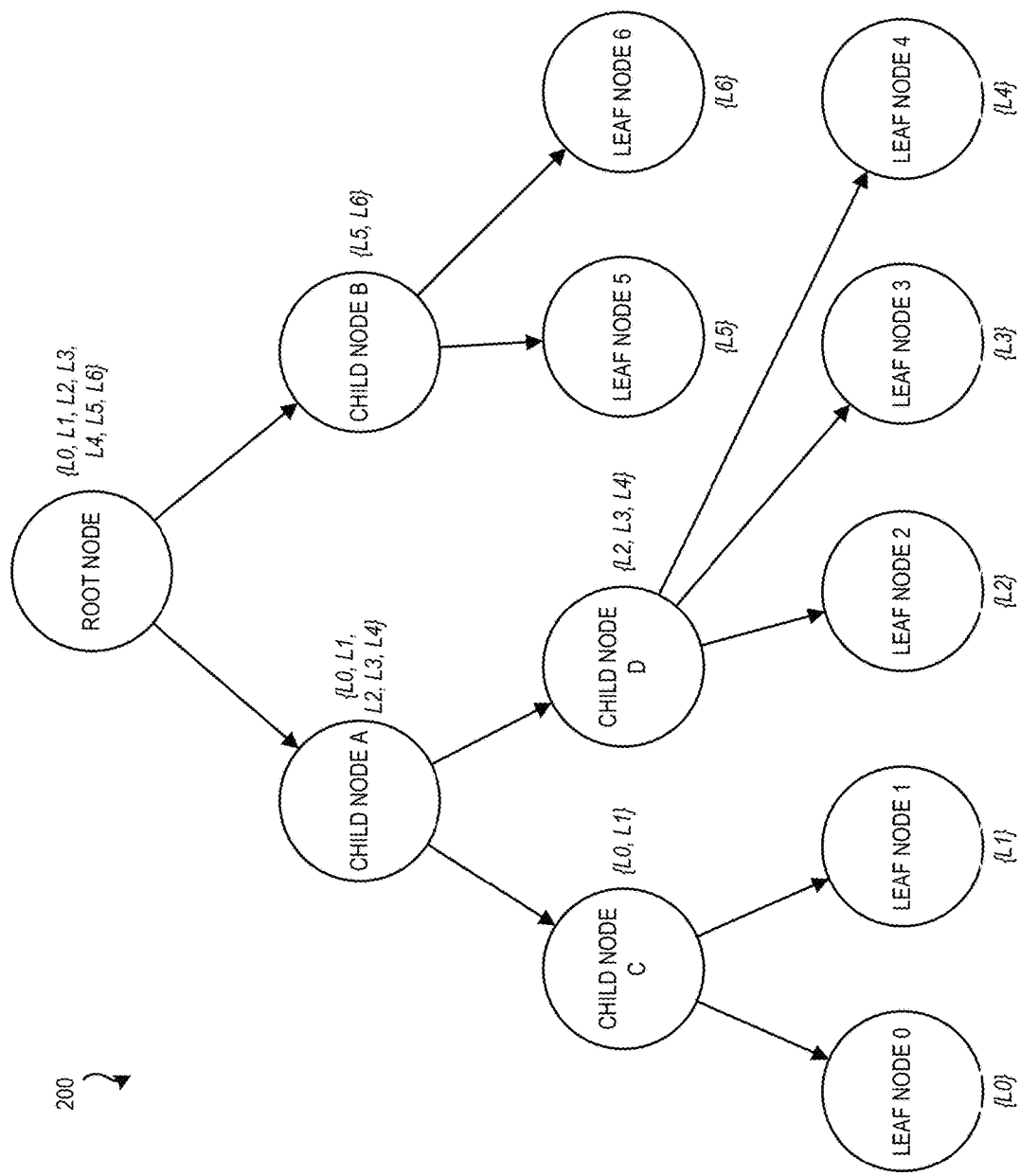
FIG. 2 illustrates an example inferred hierarchically segmented tree structure generated by a digital design system in accordance with one or more embodiments.

FIG. 2 illustrates an example inferred hierarchically segmented tree structure generated by a digital design system in accordance with one or more embodiments. The example inferred hierarchically segmented tree structure 200 represents a topically segmented representation of seven sentences L0-L6, where the seven sentences L0-L6 are represented by leaf nodes 0-6, respectively. Leaf nodes that are sibling nodes (e.g., have the same parent node) are topically related at the finest or most specific level. For example, leaf nodes 0-1 of the inferred hierarchically segmented tree structure 200 are sibling nodes of child node C, indicating that sentences L0 and L1 were determined to be topically related. Similarly, leaf nodes 2-4 are sibling nodes of child node D, indicating that sentences L2-L4 were determined to be topically related. And leaf nodes 5-6 are sibling nodes of child node B, indicating that sentences L5 and L6 were determined to be topically related. At the next level up, child nodes C and D are sibling nodes of child node A, indicating that sentences L0-L4 (e.g., the sentences represented by child nodes C and D) were determined to be topically related at a higher or coarser level. At the top level, child nodes A and B are sibling nodes of the root node, indicating that the seven sentences L0-L6 are topically related at a general or coarse level.

Returning to FIG. 1, after the hierarchical segmentation module 118 generates the inferred hierarchically segmented tree structure 120, the inferred hierarchically segmented tree structure 120 is sent to an output generating module 122, as shown at numeral 7. The output generating module 122 can configured to generate a modified representation of the unstructured text 124 based on the inferred hierarchically segmented tree structure 120.

In one or more embodiments, the output generating module 122 includes a topic generation algorithm, J. In such embodiments, the topic generation algorithm processes text fragments to infer a suitable title or topic for each segment in the inferred hierarchically segmented tree structure 120. As the topic inferred for a particular segment of the inferred hierarchically segmented tree structure 120 is based on the child nodes of a particular parent node, the topic generation algorithm processes the inferred hierarchically segmented tree structure 120, t, in a bottom-up manner. For every node, n, encountered in the bottom-up processing of the inferred hierarchically segmented tree structure 120, t, there are three possible cases: (1) node n is a singleton, (2) node n is a parent of singleton sets, or (3) node n has a non-singleton child. When node n is a singleton, the given node points to a single sentence and no topic generation processing is performed. When node n is a parent of singleton sets, let n.Sentence be the list of sentences represented by that node. Then, n.Topic is assigned to $\Im$(n.Sentence). This property will be used by the parent nodes (if they exist) of n for the informed generation of their respective titles. When node n has a non-singleton child, the input fed to $\Im$ not only includes information on its constituent sentences but also on the topics assigned to its non-singleton child nodes. The topic generation algorithm iterates over the children of node n (e.g., $n_1, n_2, \ldots n_k$), and let $n_i$ be the children in the current iteration and x be a common input variable to be fed to the topic generation algorithm. There are two possibilities: (1) node $n_i$ is a singleton, and (2) node $n_i$ is not a singleton. When node $n_i$ is a singleton, $x\mathrel{+}=n_i.\text{Sentence}.$ When node $n_i$ is not a singleton, $x\mathrel{+}=[n_i.\text{Topic},n_i.\text{Sentence}].$ In some embodiments, when node $n_i$ is not a singleton, the first three sentences can be added to x, instead of the entire sentence list (e.g., n.Sentence), to reduce processing time. The topic for a given segment is then generated as n.Topic=$\Im$(x). In one or more embodiments, the topic generated for each segment can be aggregated to generate a table of contents for the unstructured text 103. The generating of the table of contents for the unstructured text 103 enables readers to easily navigate, locate relevant information, and comprehend the overall structure of the unstructured text 103. In some embodiments, the modified representation of the unstructured text 124 can include the generated table of contents appended to the unstructured text 103.

In other embodiments, the modified representation of the unstructured text 124 is a display of the generated table of contents, where each entry in the generated table of contents can be selectable to display, highlight, or otherwise indicate, the subset of sentences of the unstructured text 103 that are associated with a corresponding table of contents entry. In one or more embodiments, in response to receiving a user input selecting an entry (e.g., a topical segment) in the generated table of contents, the sentences of the unstructured text corresponding to that segment or a summary of the sentences of the unstructured text corresponding to that segment can be displayed. In some embodiments, the summary of the sentences of the unstructured text corresponding to that segment can include additional summaries for sub-segments of the selected segment. In such embodiments, an input selecting one of the sub-segment summaries can cause the display of the sentences of the unstructured text corresponding to that selected sub-segment.

In one or more embodiments, the output generating module 122 can perform post-processing on the inferred hierarchically segmented tree structure 120 to represent it as a sequence of linear segmentations. Using the example of FIG. 2, the inferred hierarchically segmented tree structure 200 can be represented by the following sequences of linear segmentations from a coarse-grained topical segmentation (e.g., level $L_0$) to a finer-grained or more specific topical segmentation (e.g., $L_3$)

$L_0=\{L0,L1,L2,L3,L4,L5,L6\}$ $L_1=\{L0,L1,L2,L3,L4\},\{L5,L6\}$ $L_2=\{L0,L1\},\{L2,L3,L4\},\{L5\},\{L6\}$ $L_3=\{L0\},\{L1\},\{L2\},\{L3\},\{L4\},\{L5\},\{L6\}$

After the output generating module 122 generates the modified representation of the unstructured text 124, the modified representation of the unstructured text 124 can be sent as an output 130, as shown at numeral 9. In one or more embodiments, after the process described above in numerals 1-8, the output 130 is sent through a communications channel to the user device or computing device that provided the input requesting the hierarchical segmentation of the unstructured text 103, to another computing device associated with the user or another user, or to another system or application.

Figure 3:
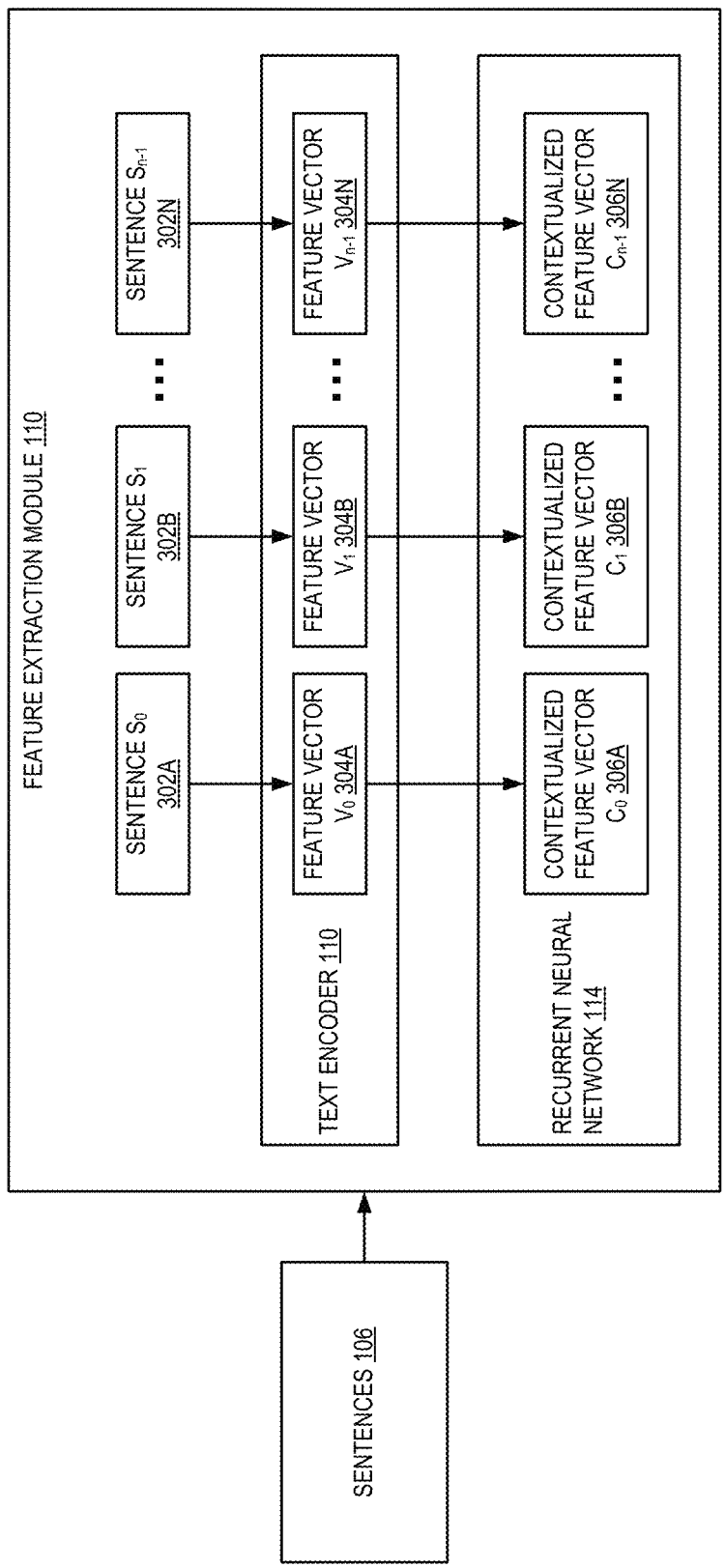
FIG. 3 illustrates a diagram of a generating contextualized feature vectors for unstructured text using a neural network in accordance with one or more embodiments.

FIG. 3 illustrates a diagram of a generating contextualized feature vectors for unstructured text using a neural network in accordance with one or more embodiments. A feature extraction module 108 can include a text encoder 110 and a recurrent neural network 114. As illustrated in FIG. 3, a plurality of sentences 106, S, of the unstructured text 103 from FIG. 1, is composed of n sentences, including sentence $S_0$ 302A, sentence $S_1$ 302B, through sentence $S_{n-1}$ 302N. Sentence $S_0$ 302A through sentence $S_{n-1}$ 302N are fed to the text encoder 110. In one or more embodiments, the text encoder 110 is a BERT encoder. The output of the text encoder 110 is a plurality of feature vectors, where each feature vector corresponds to one of the plurality of sentences 106. For example, feature vector $V_0$ 304A corresponds to sentence $S_0$ 302A, feature vector $V_1$ 304B corresponds to sentence $S_1$ 302B, and feature vector $V_{n-1}$ 304N corresponds to sentence $S_{n-1}$ 302N. In one or more embodiments, the text encoder 110 transforms the plurality of sentences 106 to the feature vectors of 384 length each. In some embodiments, the BERT encoder is a transformer-based model that includes six layers and 22 million parameters. The parameters of this model can be fine-tuned using self-attention distillation for the compression of large language models like ROBERTa-Large.

The plurality of feature vectors are then fed to a recurrent neural network 114 to generate contextualized feature vectors. In one or more embodiments, the recurrent neural network 114 is implemented using two BiLSTM layers. The output of the recurrent neural network 114 is a plurality of feature vectors, where each feature vector corresponds to one of the plurality of sentences 106. For example, contextualized feature vector $C_0$ 306A corresponds to sentence $S_0$ 302A, contextualized feature vector $C_1$ 306B corresponds to sentence $S_1$ 302B, and contextualized feature vector $C_{n-1}$ 306N corresponds to sentence $S_{n-1}$ 302N. In one or more embodiments, the final context-aware representation for a sentence is obtained by concatenating the corresponding forward and backward vectors from the last layer.

Figure 4:
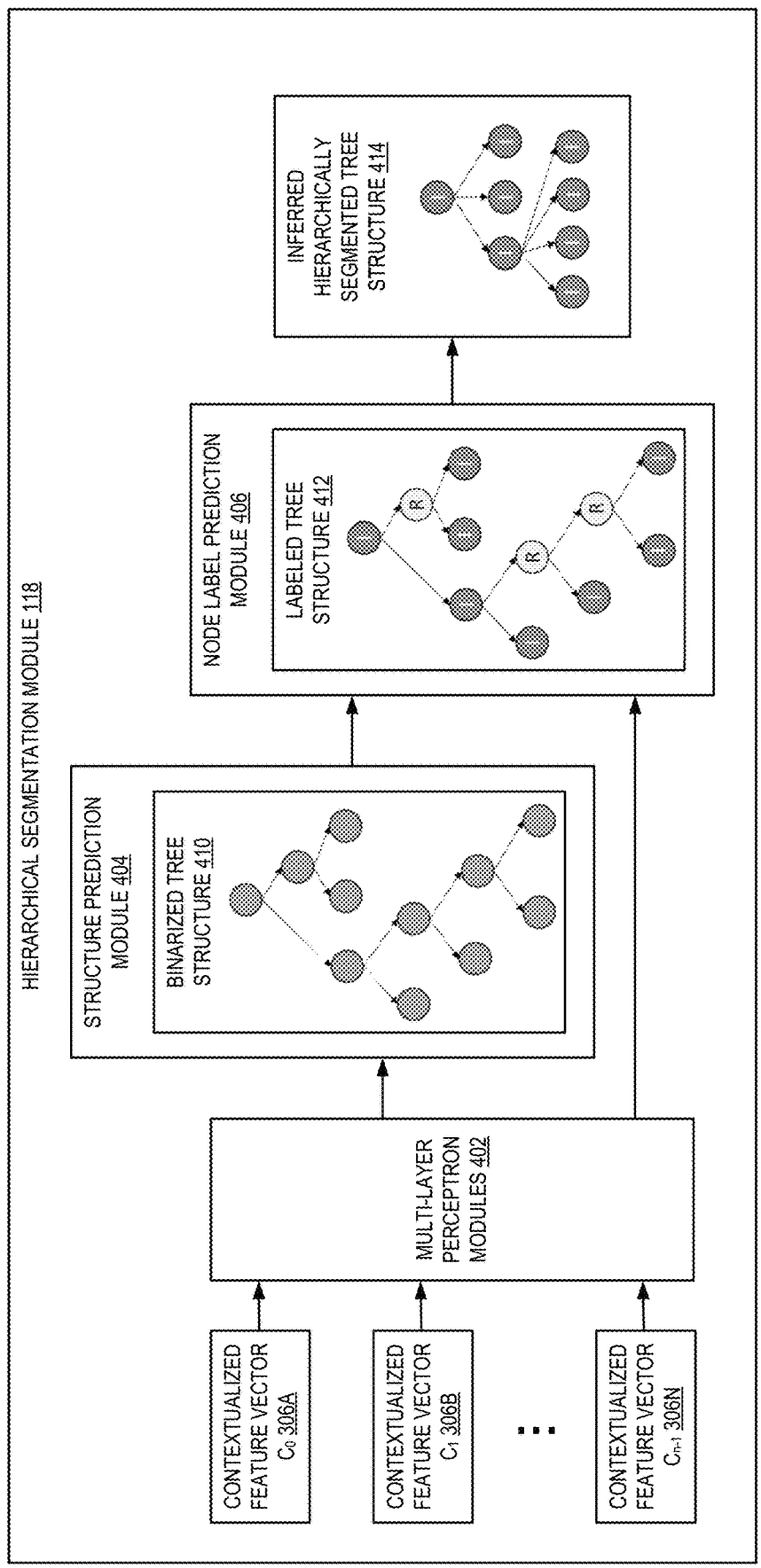
FIG. 4 illustrates a diagram of a process of inferring a hierarchically segmented tree structure representation of unstructured text using a hierarchical segmentation module in accordance with one or more embodiments.

FIG. 4 illustrates a diagram of a process of inferring a hierarchically segmented tree structure representation of unstructured text using a hierarchical segmentation module in accordance with one or more embodiments. As illustrated in FIG. 4, a hierarchical segmentation module 118 include multi-layer perceptron (MLP) modules 402, a structure prediction module 404, and a node label prediction module 406. In one or more embodiments, the multi-layer perceptron (MLP) modules 402 are neural networks trained to predict the left and right boundaries of topically coherent segments within unstructured text. The structure prediction module 404 is trained to infer/predict the structure of a binarized tree structure representation of the unstructured text 103. In one or more embodiments, the structure prediction module 404 introduces reducible node (or "dummy" nodes) when generating binarized tree structures to ensure that the tree structure created from the unstructured text 103 is maintained as a binary tree. The node label prediction module 406 is trained to infer/predict the labels for the nodes of the binarized tree structure.

In one or more embodiments, the hierarchical segmentation module 118 receives contextualized feature vector $C_0$ 306A, contextualized feature vector $C_1$ 306B, . . . , contextualized feature vector $C_{n-1}$ 306N generated from a plurality of sentences 106 (e.g., sentences, $S=s_0, s_1, \ldots, s_{n-1}$ as described in FIG. 3).

In one or more embodiments, one or more legal hierarchical trees can be analyzed In one or more embodiments, legal hierarchical trees satisfy two conditions: (1) there is a one-to-one correspondence between the leaf nodes and the constituent sentences, and (2) every node in the tree spans a consecutive sequence of sentences. To reduce time complexity resulting from considering all possible hierarchical trees with nodes having an arbitrary number of children, the search space of legal hierarchical trees is limited to binarized trees. In one or more embodiments, to generate legal hierarchical binary trees, reducible nodes are added to the tree so that no node has greater than two child nodes. In such embodiments, the hierarchical segmentation module 118 associates a node type from the set {R, I} to each node, where R are the reducible nodes (e.g., the "dummy" nodes) and I are irreducible nodes (e.g., the nodes that are required when converting the binarized tree structure to the inferred hierarchically segmented tree structure 414. Under this formulation, every node in binarized tree structure, $\bar{t}$, can be represented by a triplet (i, j, l) which indicates that the corresponding node of type $l \in \{R, I\}$ spans $s_i, s_{i+1}, \ldots, s_j$.

In one or more embodiments, the hierarchical segmentation module 118 includes a structure prediction module 404 that includes a scoring function to assign a score for each node in tree, t. Each node in a predicted binarized tree, t, can be expressed as a tuple, where the tuple denotes the sequence of sentences included in the corresponding segment represented by the node. In this manner, a predicted binarized tree can be represented as a series of tuples. In one or more embodiments, s(i, j) represents the score for a node (i, j) representing a segment spanning sentences $s_i$, $s_{i+1}, \ldots, s_j$. In one or more embodiments, for the computation of s(i, j) for a node (i, j), the contextualized feature vectors for the corresponding sentences (e.g., from the contextualized feature vectors 306A-N) are provided to two multi-layer perceptron (MLP) modules 402 to first infer the left and right boundary representation vectors as follows:

$$r_i^s; l_i^s = MLP_r^s(C_i); MLP_l^s(C_i)$$

The multi-layer perceptron (MLP) modules 402 are feed-forward neural networks. In one or more embodiments, the dimension of the boundary vectors for structure prediction is set to 500. The computation of the score, s(i, j), can then be computed as follows:

$$s(i,j) = l_i^{sT} W r_j^s$$

where $W \in R^{d \times d}$ is a trainable parameter.

The function S to score the predicted binarized tree, t, using the sequence S can then be defined as:

$$S(S, t) = \sum_{(i,j) \in t} s(i, j)$$

which sums the scores of all the segments, or tuples, present in a predicted binarized tree, t, to associate a score to the particular predicted binarized tree, t. This process is repeated for all possible legal hierarchical trees.

Using a neural conditional random field (CRF) that explicitly models the statistical dependencies between nodes and their constituent child nodes, conditional probability can be represented as:

$$\mathbb{P}(t \mid S) = \frac{S(S, t)}{Z(S) := \sum_{\hat{t}} S(S, \hat{t})}$$

where the denominator sums the score of all possible legal hierarchical trees. As noted previously, the computation of the partition function Z(S) in the denominator can be intractable (exponential time complexity) if all possible hierarchical trees with nodes having arbitrary number of children are considered. Thus, restricting the search space to binarized trees offers efficient dynamic programming algorithm to compute the partition function with polynomial time complexity.

In one or more embodiments, to identify the optimal binarized tree (e.g., the binarized tree structure 410 that maximizes P(t̃|S)), the Cocke-Younger-Kasami algorithm (CYK) algorithm is used, as follows:

$$\hat{t} = \arg\max_t S(S, t) = \arg\max_t \mathbb{P}(t|S)$$

After the binarized tree structure 410 that maximizes P(ã|S) is determined by the structure prediction module 404, the binarized tree structure 410 is provided to the node label prediction module 406. For each span (i, j), in the binarized tree structure 410, a node label prediction module 406 predicts its node types to generate a labeled tree structure 412 from the binarized tree structure 410. An additional set of boundary vectors are derived to compute s(i, j, l) for node label prediction (e.g., to determine whether a node is a reducible node or an irreducible node), which can be represented as follows:

$$r_i^l; l_i^l = MLP_r^l(C_i); MLP_l^l(C_i)$$

In one or more embodiments, the dimension of the boundary vectors for node label prediction is set to 800. The computation of the score, s(i, j, l), can then be computed as follows:

$$s(i,j,l) = l_i^{l^T} W_l r_j^l$$

where l can be "I" or "R", where $W_I$ and $W_R$ are used to derive the scores s(i, j, I) and s(i, j, R), respectively. For each node, the probability values, or scores, s(i, j, I) and s(i, j, R), are calculated to determine the probability that the node is an irreducible node and a reducible node, respectively. The two probability values can then be compared, with the higher value of s(i, j, I) and s(i, j, R) indicating the node label for the node. This can be represented as follows:

$$l = \arg\max_{\hat{l} \in \{R, I\}} s(i, j, \hat{l})$$

Figure 5:
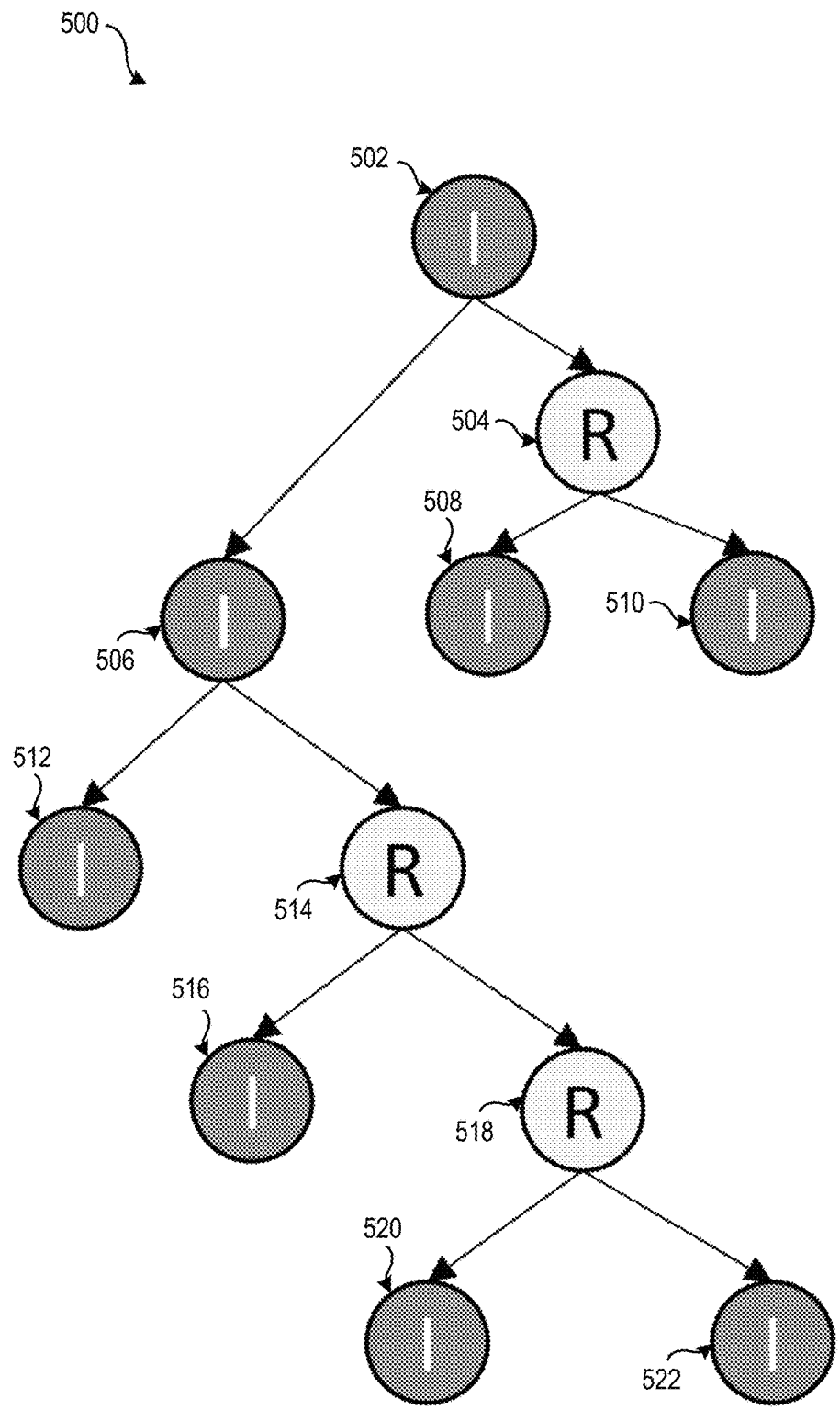
FIG. 5 illustrates an example labeled tree structure in accordance with one or more embodiments.

After determining the labels for each node of the binarized tree structure 410, the binarized tree structure 410 can be represented visually as the labeled tree structure 412. While the diagram of FIG. 4 illustrates a labeled tree structure 412 with node labels for each node, in some embodiments, rather than constructing labeled tree structure 412, the node labels for each of the nodes in the binarized tree structure 410 are stored, or otherwise associated, with data for the corresponding node. In one or more embodiments, using the labeled tree structure 412, or the node label data, the hierarchical segmentation module 118 generates the inferred hierarchically segmented tree structure 414 for the unstructured text 103. In one or more embodiments, to generate the inferred hierarchically segmented tree structure 414, each reducible ("R") node is removed, with any child nodes of the reducible node attached to the direct parent of the reducible node. In some embodiments, this process can be a bottoms-up process starting at the lowest reducible node in the binarized tree structure 410, as described with respect to FIG. 5. FIG. 5 illustrates an example labeled tree structure in accordance with one or more embodiments. As illustrated in FIG. 5, labeled tree structure 500 (corresponding to labeled tree structure 412 predicted in FIG. 4) includes a plurality of nodes 502-522. In one or more embodiments, to generate the inferred hierarchically segmented tree structure 414, the reducible nodes (e.g., nodes 504, 514, and 518) are removed, with the child nodes of the reducible nodes connected to the parent node of the reducible nodes. For example, using a bottom-up approach, node 518 is removed and node 520 and node 522 connected to node 514. As node 514 is a reducible node, it is also removed, with node 516, node 520, and node 522 connected to node 506. Node 512 and its parent node, node 506, are both irreducible nodes and connected to an irreducible root node 502, so no action is taken. As node 504 is a reducible node, it is removed, with node 508 and node 510 connected to the root node 502. The result of the removal of the reducible nodes is the inferred hierarchically segmented tree structure 414 depicted in FIG. 4

Figure 6:
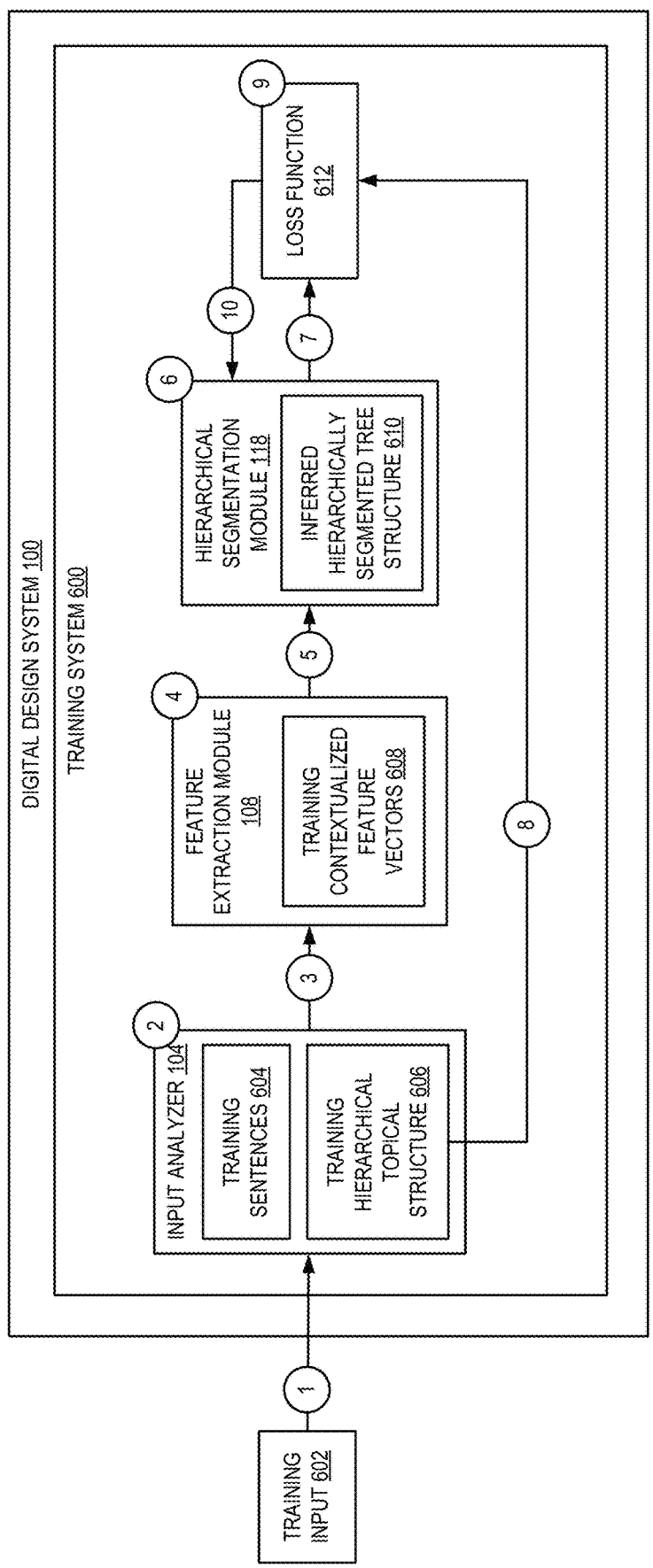
FIG. 6 illustrates a diagram of a process of training machine learning models to segmenting unstructured text into topically coherent segments using machine learning models in accordance with one or more embodiments.

FIG. 6 illustrates a diagram of a process of training machine learning models to segmenting unstructured text into topically coherent segments using machine learning models in accordance with one or more embodiments. In one or more embodiments, a training system 600 is configured to train neural networks (e.g., multi-layer perceptron (MLP) modules 402) to generate boundary vectors for topically coherent segments within unstructured text. In some embodiments, the training system 600 is a part of a digital design system 100. In other embodiments, the training system 600 can be a standalone system, or part of another system, and deployed to the digital design system 100. For example, the training system 600 may be implemented as a separate system implemented on electronic devices separate from the electronic devices implementing digital design system 100. As shown in FIG. 6, the training system 600 receives a training input 602, as shown at numeral 1. For example, the digital design system 100 receives the training input 602 from a user via a computing device or from a memory or storage location. The training input 602 can include sentences for multiple articles that can be fed to the training system 600 in parallel or in series.

In one or more embodiments, the training input 602 is generated using hierarchical segmentation structure annotations for online encyclopedic articles (e.g., Wikipedia articles in the WIKI-727K training dataset, other large document collections, etc.). The articles in their HTML form can be pre-processed to remove non-text elements (e.g., tables and figures) and short segments and sub-segments (e.g., segments and sub-segments spanning fewer than three sentences). The HTML can further include markup tags (<h1>, <h2>, ..., <h6>) associated with different segments that define the level of hierarchy for a given text segment. For example, sentences under the <h1> markup tag are a highest level segment, with sentences under the <h2> markup tag being at a next lower segment (e.g., a sub-segment under the <h1> segment). The markup information and the HTML elements of an article can thus be used to determine the hierarchical structure of the various segments in the article.

In one or more embodiments, let the sequence of HTML elements associated with an article be $X = x_0, x_1, \ldots, x_{L-1}$, where $x_i$.TAG denotes the markup type associated with $x_i$, and $x_i$.TEXT denotes the text associated with $x_i$. In some embodiments, an algorithm is then used to obtain the hierarchical organization of the article represented by a tree structure rooted at T, where the non-leaf nodes represent topics and the leaf nodes represent sentences from the article. The algorithm iterates over the elements in X and progressively adds them to the tree structure rooted at T. The algorithm maintains a reference to the node c that is last added to the tree structure. To add the next element x, the algorithm only considers two possibilities: (a) x is the next child of c, or (b) x is the next child of one of the ancestors of c. This is to ensure that the preorder traversal of T recovers X (which happens when x is added using the above two rules). To find the element to which x must be added, the algorithm associates a priority to each markup type in the following decreasing order: (<h1>, <h2>, ... <h6>, p, where $h_i$ indicates segment/sub-segments headings and p its associated text. For adding x, c is updated to its parent until the priority of c exceeds that of x. The hierarchical organization of the article generated by the algorithm allows nodes to have more than two child nodes.

In one or more embodiments, to ensure tractable training and inference, the hierarchical organization of the article (e.g., a hierarchically segmented tree structure, t) is converted from a general tree structure to a binarized tree structure, $\tilde{t}$, where each node is allowed to have a maximum of two child nodes. To binarize the hierarchical organization of the article, an algorithm checks each node x in tree structure T that has more than two children and partitions the children into two sets having ||x.CHILDREN||−1 children and 1 child, respectively. A new node is then constructed whose children are assigned to the former set, followed by the updating of x.CHILDREN to contain the new node and the latter set in the partition. This is repeated until the tree is devoid of nodes with more than 2 children. To ensure recoverability, two types of nodes are defined in the binarized trees: reducible (R) nodes and irreducible (I) node. The nodes retained from T are the I nodes and nodes added to convert T to the binarized form are referred to as R nodes. In one or more embodiments, the node type, or node label, for a node is assigned to the node's "TYPE" property.

In some embodiments, data augmentation is applied to the training dataset to address a limitation resulting from the fact that each article of the training dataset is based on a single global topic, and the direct usage of this data will only train the model in detecting fine-grained topical shifts resulting from sub-segments/sub-headings. However, an article in practice can also include fragments with stark topical contrasts. To address this, the data augmentation strategy is introduced, where a subset of tree roots is sampled at every iteration. For example, a plurality of different articles on different topics are selected, each with a separate hierarchical organization with a root node. Thereafter, some of the children of each of these root nodes are randomly dropped and the ordering of leftover children is randomly permuted. Dropping random nodes can ensure that the inference is not very strongly dependent on the position of the topical themes and the random permutation of the child nodes can ensure that the model robustly infers topical segments independent of the order of the child nodes. Finally, a new root node is created, and each of the sampled root nodes are appended to the new root node as its children. This new root node is more topically diverse as it includes several coarse topics (e.g., the children of new root node come from different documents and thus they have stark topical contrast). However, the descendants of these child nodes are more coherent with the underlying theme. This explicitly teaches the model to understand that the coarseness of the topical shift decreases as we go deeper into the hierarchy. In one or more embodiments, the data augmentation is performed at every epoch ensuring the number of artificially synthesized datapoints is equal to the actual number of documents in the train split.

As illustrated in FIG. 6, the digital design system 100 includes an input analyzer 104 that receives the training input 602. In some embodiments, the input analyzer 104 analyzes the training input 602, at numeral 2. In some embodiments, the input analyzer 104 analyzes the training input 602 to identify the training sentences 604 and a training hierarchical topical structure 606.

The training sentences 604 are sent to a feature extraction module 108, as shown at numeral 3. The feature extraction module 108 generates training contextualized feature vectors 608 from the training sentences 604, at numeral 4, as described previously with respect to FIG. 3. The training contextualized feature vectors 608 generated by the feature extraction module 108 are then sent to a hierarchical segmentation module 118, as shown at numeral 5.

The hierarchical segmentation module 118 generates an inferred hierarchically segmented tree structure 610 from the training contextualized feature vectors 608, at numeral 6, in the process as described previously with respect to FIG. 4. The inferred hierarchically segmented tree structure 610 is then passed to the loss function 612, as shown at numeral 7. The training hierarchical topical structure 606 is also passed to the loss function 612, as shown at numeral 8.

Using the training hierarchical topical structure 606 and the inferred hierarchically segmented tree structure 610, the loss function 612 can calculate a loss, at numeral 9. An instance in the labeled dataset can be represented by (S, $\tilde{t}$, l), where l is the set of all spans annotated with their corresponding type from {R,I}. In one or more embodiments, the loss function is formed by accumulating two components, as follows:

$$L(S,\tilde{t},l)=L_s(S,\tilde{t})+L_l(S,\tilde{t},l)$$

The first term tries to maximize log (P(t|S)) by refining the scoring function s(i,j). The second term establishes cross-entropy loss for the type prediction of the constituent spans.

The calculated loss can then be backpropagated to train the hierarchical segmentation module 118, as shown at numeral 10.

Figure 7:
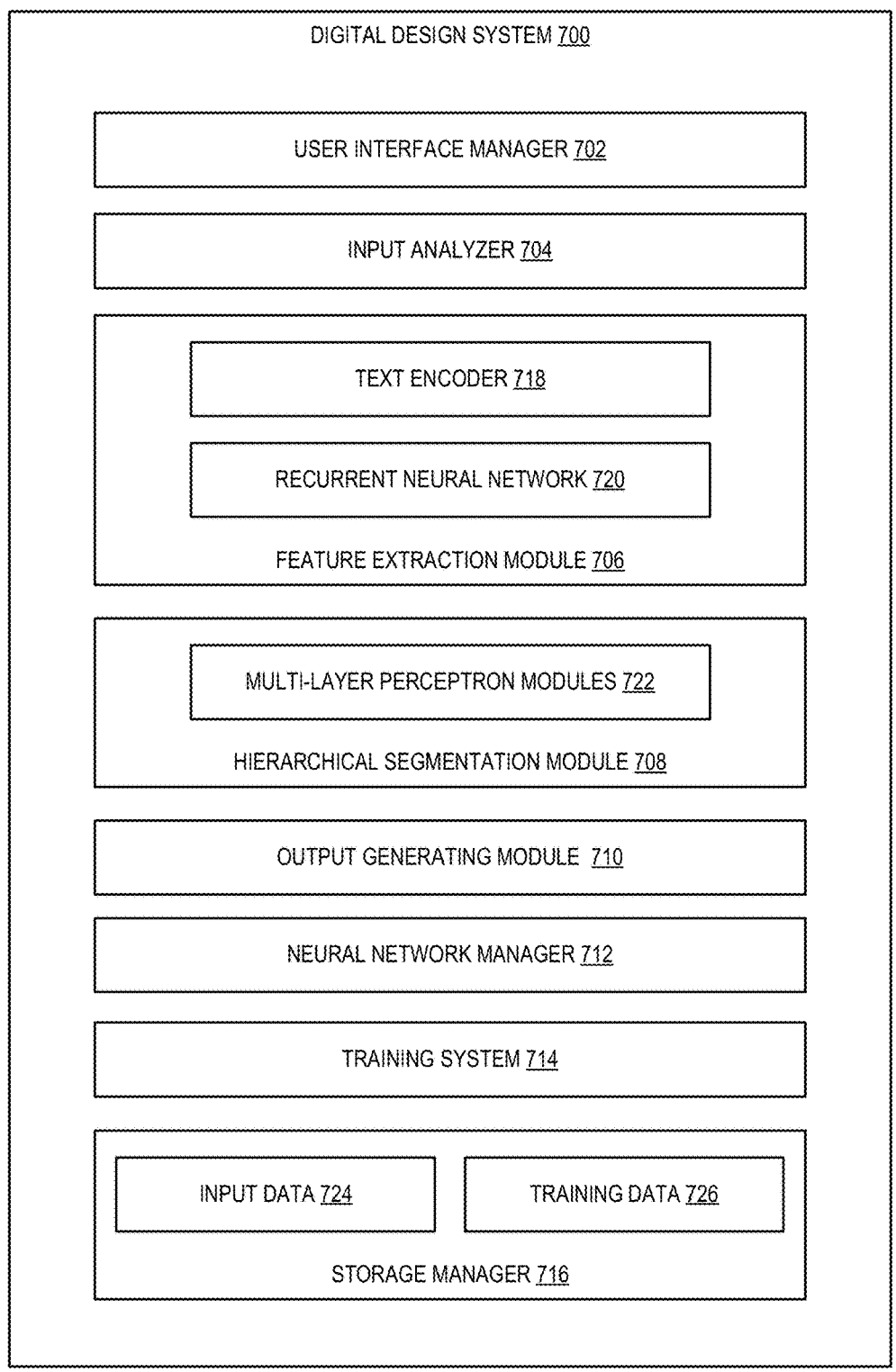
FIG. 7 illustrates a schematic diagram of a digital design system in accordance with one or more embodiments.

FIG. 7 illustrates a schematic diagram of a digital design system (e.g., "digital design system" described above) in accordance with one or more embodiments. As shown, the digital design system 700 may include, but is not limited to, a user interface manager 702, an input analyzer 704, a feature extraction module 706, a hierarchical segmentation module 708, an output generating module 710, a neural network manager 712, a training system 714, and a storage manager 716. The storage manager 716 includes input data 724 and training data 726.

As illustrated in FIG. 7, the digital design system 700 includes a user interface manager 702. For example, the user interface manager 702 allows users to provide input data to the digital design system 700. In some embodiments, the user interface manager 702 provides a user interface through which the user can upload unstructured text, as discussed above. Alternatively, or additionally, the user interface may enable the user to download the unstructured text from a local or remote storage location (e.g., by providing an address (e.g., a URL or other endpoint) associated with a data source).

As further illustrated in FIG. 7, the digital design system 700 also includes an input analyzer 704. The input analyzer 704 analyzes an input received by the digital design system 700 to identify sentences from unstructured text. For example, the input analyzer 704 can extract each sentence from the unstructured text as a separate token or object that can be provided to the feature extraction module 706. The input analyzer 704 can be further be configured to identify training sentences and training hierarchical topical structures representing the training sentences from a training input received by the digital design system 700.

As further illustrated in FIG. 7, the digital design system 700 also includes a feature extraction module 706 configured to extract features, or feature vectors, from an input. In one or more embodiments, the feature extraction module 706 includes a text encoder 718 and a recurrent neural network 720. For example, the text encoder 718 extracts text features (e.g., feature vectors or embeddings) from an input that includes sentences of unstructured text. In one or more embodiments, the text features generated by the text encoder 718 are feature vectors that are n-dimensional vectors of numerical features that represent the sentences of unstructured text. In one or more embodiments, the text encoder 110 is a Bidirectional Encoder Representations from Transformers (BERT) encoder. The recurrent neural network 720 is configured to extract contextualized feature vectors using the feature vectors generated by the text encoder 718 from the sentences of unstructured text. The contextualized feature vectors generated by the recurrent neural network 720 consider, or take into account, the text features of a sentence of the unstructured text, as well as the text features of other sentences of the unstructured. In one or more embodiments, the recurrent neural network 720 is a Bidirectional Long Short-Term Memory (BiLSTM) network.

In one or more embodiments, a neural network includes deep learning architecture for learning representations of audio and/or video. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

As further illustrated in FIG. 7, the digital design system 700 also includes a hierarchical segmentation module 708 trained to predict an inferred hierarchically segmented tree structure representing sentences of unstructured text. In one or more embodiments, the hierarchical segmentation module 708 include multi-layer perceptron modules 722, or other similar feedforward neural networks, trained to predict the left and right boundary representation vectors for unstructured text using contextualized feature vectors generated by the feature extraction module 706. The hierarchical segmentation module 708 uses a structure prediction module to infer a binarized tree structure based on the output of the multi-layer perceptron modules 722 and a node label prediction module to infer a node label for each node of the binarized tree structure. The hierarchical segmentation module 708 can then convert the binarized tree structure to the inferred hierarchically segmented tree structure. When converted to the inferred hierarchically segmented tree structure, each leaf node represents sentences of the unstructured text, and each non-leaf node represents a topically coherent segment based on the children of the non-leaf node. In one or more embodiments, nodes closer to the root node represent broader or coarse-grained topical segments, whiles nodes further from the root node represent more specific or fine-grained topical segments.

As further illustrated in FIG. 7, the digital design system 700 also includes an output generating module 710. In one or more embodiments, the output generating module 710 is configured generate a modified representation of the unstructured text based on the inferred hierarchically segmented tree structure. In some embodiments, the segments and sub-segments of the inferred hierarchically segmented tree structure can be fed to a topic generating algorithm or process to generate summaries and/or titles for each segment and sub-segment. In one or more embodiments, the output generating module 710 can further generate a table of contents for the unstructured text based on the generated summaries and/or titles.

As illustrated in FIG. 7, the digital design system 700 also includes a neural network manager 712. Neural network manager 712 may host a plurality of neural networks or other machine learning models, such as recurrent neural network 720 and multi-layer perceptron modules 722. The neural network manager 712 may include an execution environment, libraries, and/or any other data needed to execute the machine learning models. In some embodiments, the neural network manager 712 may be associated with dedicated software and/or hardware resources to execute the machine learning models. Although depicted in FIG. 7 as being hosted by a single neural network manager 712, in various embodiments the neural networks may be hosted in multiple neural network managers and/or as part of different components.

As illustrated in FIG. 7 the digital design system 700 also includes training system 714. The training system 714 can teach, guide, tune, and/or train one or more neural networks. In particular, the training system 714 can train a neural network based on a plurality of training data. More specifically, the training system 714 can access, identify, generate, create, and/or determine training input and utilize the training input to train and fine-tune a neural network. In particular, the training system 714 can train, at least, the multi-layer perceptron modules 722, based on training data.

As illustrated in FIG. 7, the digital design system 700 also includes the storage manager 716. The storage manager 716 maintains data for the digital design system 700. The storage manager 716 can maintain data of any type, size, or kind as necessary to perform the functions of the digital design system 700. The storage manager 716, as shown in FIG. 7, includes input data 724 and training data 726. In particular, the input data 724 may include unstructured text received by the digital design system 700. The training data 726 can include a plurality of articles from training datasets, as discussed in additional detail above. In particular, in one or more embodiments, the training data 726 include training sentences (e.g., from online encyclopedia article utilized by the training system 714 to train one or more neural networks to generate hierarchical segmentations of unstructured text.

Each of the components 702-716 of the digital design system 700 and their corresponding elements (as shown in FIG. 7) may be in communication with one another using any suitable communication technologies. It will be recognized that although components 702-716 and their corresponding elements are shown to be separate in FIG. 7, any of components 702-716 and their corresponding elements may be combined into fewer components, such as into a single facility or module, divided into more components, or configured into different components as may serve a particular embodiment.

The components 702-716 and their corresponding elements can comprise software, hardware, or both. For example, the components 702-716 and their corresponding elements can comprise one or more instructions stored on a computer-readable storage medium and executable by processors of one or more computing devices. When executed by the one or more processors, the computer-executable instructions of the digital design system 700 can cause a client device and/or a server device to perform the methods described herein. Alternatively, the components 702-716 and their corresponding elements can comprise hardware, such as a special purpose processing device to perform a certain function or group of functions. Additionally, the components 702-716 and their corresponding elements can comprise a combination of computer-executable instructions and hardware.

Furthermore, the components 702-716 of the digital design system 700 may, for example, be implemented as one or more stand-alone applications, as one or more modules of an application, as one or more plug-ins, as one or more library functions or functions that may be called by other applications, and/or as a cloud-computing model. Thus, the components 702-716 of the digital design system 700 may be implemented as a stand-alone application, such as a desktop or mobile application. Furthermore, the components 702-716 of the digital design system 700 may be implemented as one or more web-based applications hosted on a remote server. Alternatively, or additionally, the components of the digital design system 700 may be implemented in a suite of mobile device applications or "apps."

As shown, the digital design system 700 can be implemented as a single system. In other embodiments, the digital design system 700 can be implemented in whole, or in part, across multiple systems. For example, one or more functions of the digital design system 700 can be performed by one or more servers, and one or more functions of the digital design system 700 can be performed by one or more client devices. The one or more servers and/or one or more client devices may generate, store, receive, and transmit any type of data used by the digital design system 700, as described herein.

In one implementation, the one or more client devices can include or implement at least a portion of the digital design system 700. In other implementations, the one or more servers can include or implement at least a portion of the digital design system 700. For instance, the digital design system 700 can include an application running on the one or more servers or a portion of the digital design system 700 can be downloaded from the one or more servers. Additionally, or alternatively, the digital design system 700 can include a web hosting application that allows the client device(s) to interact with content hosted at the one or more server(s).

For example, upon a client device accessing a webpage or other web application hosted at the one or more servers, in one or more embodiments, the one or more servers can provide access to one or more files including unstructured text stored at the one or more servers. Moreover, the client device can receive a request (i.e., via user input) to segment the unstructured text into topically coherent segments and provide the request to the one or more servers. Upon receiving the request, the one or more servers can automatically perform the methods and processes described above to segment the unstructured text into topically coherent segments. The one or more servers can provide a modified representation of the unstructured text, or data indicating the topically coherent segments of the unstructured text, to the client device for display to the user.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 9. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 9.

The server(s) may include one or more hardware servers (e.g., hosts), each with its own computing resources (e.g., processors, memory, disk space, networking bandwidth, etc.) which may be securely divided between multiple customers (e.g., client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 9.

Figure 8:
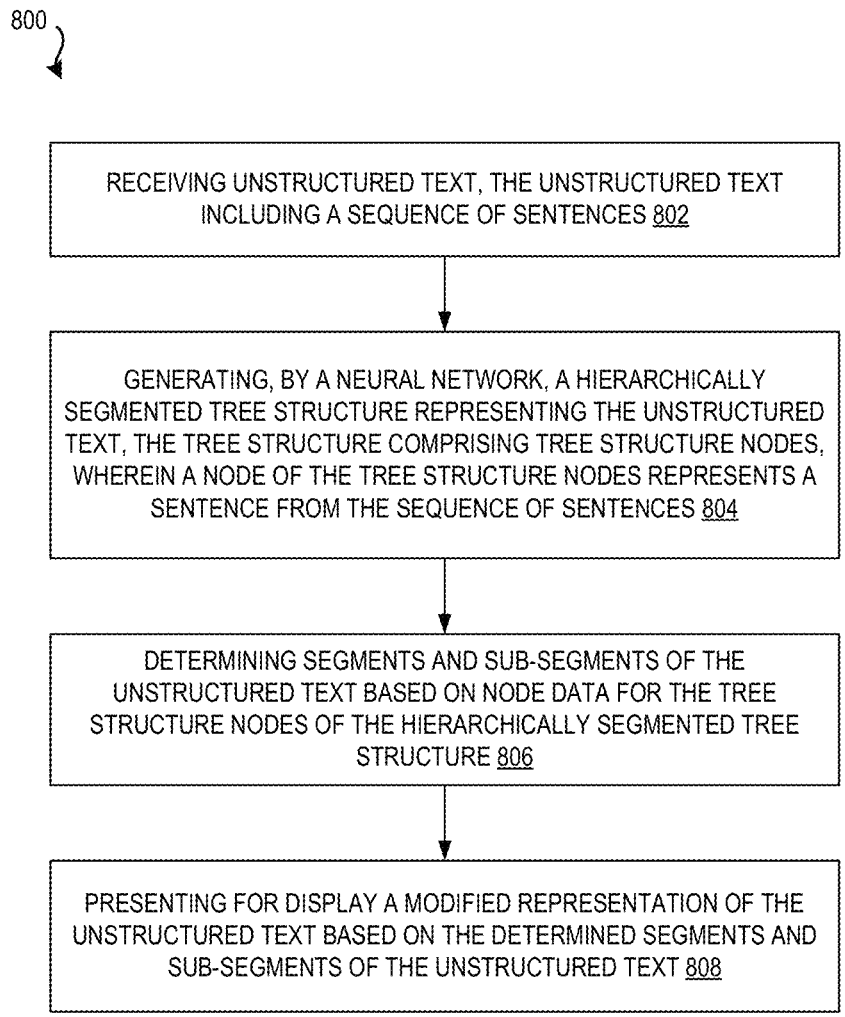
FIG. 8 illustrates a flowchart of a series of acts in a method of segmenting unstructured text into topically coherent segments using a trained digital design system in accordance with one or more embodiments.

FIGS. 1-7, the corresponding text, and the examples, provide a number of different systems and devices that segment unstructured text into topically coherent segments. In addition to the foregoing, embodiments can also be described in terms of flowcharts comprising acts and steps in a method for accomplishing a particular result. For example, FIG. 8 illustrates a flowchart of an exemplary method in accordance with one or more embodiments. The method described in relation to FIG. 8 may be performed with fewer or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart of a series of acts in a method of segmenting unstructured text into topically coherent segments using a trained digital design system in accordance with one or more embodiments. In one or more embodiments, the method 800 is performed in a digital medium environment that includes the digital design system 700. The method 800 is intended to be illustrative of one or more methods in accordance with the present disclosure and is not intended to limit potential embodiments. Alternative embodiments can include additional, fewer, or different steps than those articulated in FIG. 8.

As illustrated in FIG. 8, the method 800 includes an act 802 of receiving unstructured text, the unstructured text including a sequence of sentences. In one or more embodiments, the unstructured text is an input to the digital design system for which a user is requesting to be segmented into topically coherent segments. In one or more embodiments, the digital design system receives the unstructured text from a user (e.g., via a computing device). In one or more embodiments, the user may select or provide the unstructured text in an application, or the user may submit the unstructured text to a web service or an application configured to receive inputs. The unstructured text can also be a portion selected from a longer portion of unstructured text. For example, after providing the unstructured text to the application, the application can provide an interface to enable the user to select a portion of the unstructured text.

As illustrated in FIG. 8, the method 800 includes an act 804 of generating, by a neural network, a hierarchically segmented tree structure representing the unstructured text, the tree structure comprising tree structure nodes, wherein a node of the tree structure nodes represents a sentence from the sequence of sentences. In one or more embodiments, the digital design system passes the unstructured text through a text encoder to generate a feature vector, or feature embedding, for each sentence of the unstructured text. The feature vectors are then passed through a recurrent neural network to generate contextualized feature vectors where a contextualized vector for a sentence is based on the text features of the sentence and the text features of other sentences of the unstructured text. The contextualized feature vectors are then passed to two multi-layer perceptron networks (e.g., or similar feedforward neural networks). In one or more embodiments, the first multi-layer perceptron network is trained to predict a binarized tree structure representation of the unstructured text. To generate the binarized tree structure representation of the unstructured text, reducible nodes are added to maintain the tree structure as a binary tree. The second multi-layer perceptron network is trained to predict node labels, either reducible or irreducible, for each of the nodes of the binarized tree structure representation. The binarized tree structure representation can then be converted to the hierarchically segmented tree structure by identifying the reducible nodes in the binarized tree structure representation, removing the reducible nodes, and connecting any direct descendants of the reducible node with a direct parent node of the reducible node.

As illustrated in FIG. 8, the method 800 includes an act 806 of determining segments and sub-segments of the unstructured text based on node data for the tree structure nodes of the hierarchically segmented tree structure. When converted to the hierarchically segmented tree structure, each leaf node represents sentences of the unstructured text, and each non-leaf node represents a topically coherent segment based on the children of the non-leaf node. In one or more embodiments, nodes closer to the root node represent broader or coarse-grained topical segments, whiles nodes further from the root node represent more specific or fine-grained topical segments.

As illustrated in FIG. 8, the method 800 includes an act 808 of presenting for display a modified representation of the unstructured text based on the determined segments and sub-segments of the unstructured text. In one or more embodiments, the digital design system includes, or accesses, a topic generating model, to generate summaries for each determined segment and sub-segment of the of the unstructured text. In some embodiments, the summaries can be a one or more sentence summation of the sentences in the corresponding segment or sub-segment. In other embodiments, the summaries can be a title summarizing the sentences in the corresponding segment or sub-segment. In one or more embodiments, the modified representation of the unstructured text is a table of contents generated by the digital design system using the generated summaries. In one or more embodiments, the modified representation of the unstructured text can be a display of the unstructured text that provides an indication of the segments and sub-segments of the unstructured text (e.g., via highlighting or other visual indicators).

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
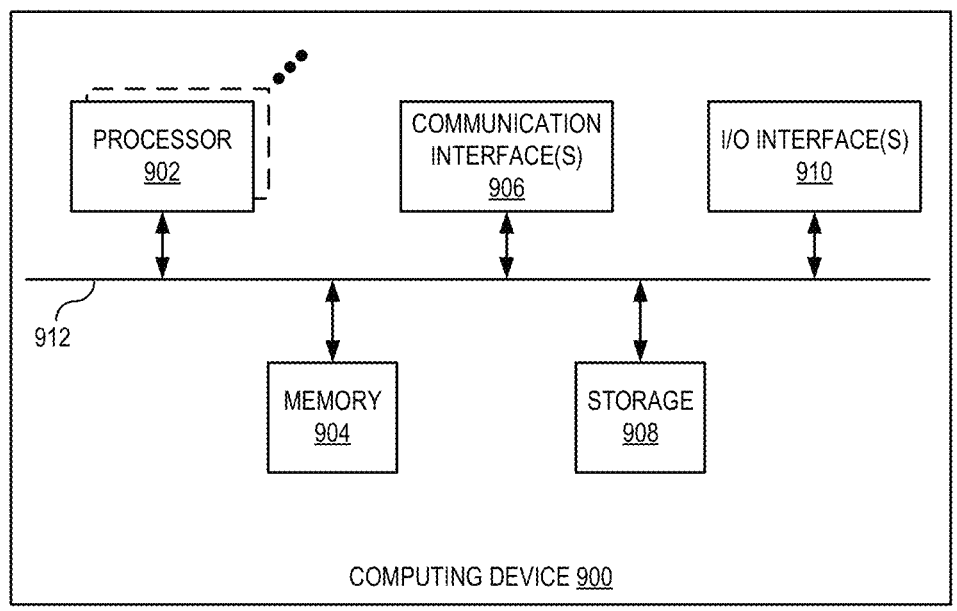
FIG. 9 illustrates a block diagram of an exemplary computing device in accordance with one or more embodiments.

FIG. 9 illustrates, in block diagram form, an exemplary computing device 900 that may be configured to perform one or more of the processes described above. One will appreciate that one or more computing devices such as the computing device 900 may implement the digital design system. As shown by FIG. 9, the computing device can comprise a processor 902, memory 904, one or more communication interfaces 906, a storage device 908, and one or more I/O devices/interfaces 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 908 and decode and execute them. In various embodiments, the processor(s) 902 may include one or more central processing units (CPUs), graphics processing units (GPUs), field programmable gate arrays (FPGAs), systems on chip (SoC), or other processor(s) or combinations of processors.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 can further include one or more communication interfaces 906. A communication interface 906 can include hardware, software, or both. The communication interface 906 can provide one or more interfaces for communication (such as, for example, packet-based communication) between the computing device and one or more other computing devices 900 or one or more networks. As an example, and not by way of limitation, communication interface 906 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

The computing device 900 includes a storage device 908 includes storage for storing data or instructions. As an example, and not by way of limitation, storage device 908 can comprise a non-transitory storage medium described above. The storage device 908 may include a hard disk drive (HDD), flash memory, a Universal Serial Bus (USB) drive or a combination these or other storage devices. The computing device 900 also includes one or more input or output ("I/O") devices/interfaces 910, which are provided to allow a user to provide input to (such as user strokes), receive output from, and otherwise transfer data to and from the computing device 900. These I/O devices/interfaces 910 may include a mouse, keypad or a keyboard, a touch screen, camera, optical scanner, network interface, modem, other known I/O devices or a combination of such I/O devices/interfaces 910. The touch screen may be activated with a stylus or a finger.

The I/O devices/interfaces 910 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 910 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
receiving unstructured text, the unstructured text including a sequence of sentences;
generating, by a neural network, a hierarchically segmented tree structure representing the unstructured text, the tree structure comprising tree structure nodes, wherein a leaf node of the tree structure nodes represents a sentence from the sequence of sentences;
determining segments and sub-segments of the unstructured text based on node data for the tree structure nodes of the hierarchically segmented tree structure; and
presenting for display a modified representation of the unstructured text based on the determined segments and sub-segments of the unstructured text.

2. The method of claim 1, wherein generating the hierarchically segmented tree structure representing the unstructured text further comprises:
converting the hierarchically segmented tree structure representing the unstructured text from a binarized tree structure by:
identifying reducible nodes in the binarized tree structure, wherein reducible nodes do not represent a sentence from the sequence of sentences, and
for each reducible node, removing the reducible node and connecting direct descendants of the reducible node with a direct parent node of the reducible node.

3. The method of claim 2, wherein generating the hierarchically segmented tree structure representing the unstructured text further comprises:
generating, using a text encoder, feature vectors for each sentence of the sequence of sentences;
generating, using a recurrent neural network, contextualized feature vectors using the generated feature vectors;
predicting a structure of the binarized tree structure; and
labeling each node of a plurality of nodes in the binarized tree structure as a reducible node or an irreducible node.

4. The method of claim 3, wherein labeling each node of the plurality of nodes in the binarized tree structure as a reducible node or an irreducible node comprises:
for each node in the binarized tree structure:
determining a first probability value that a node is a reducible node and a second probability value that a node is an irreducible node,
when the first probability value is greater than the second probability value, determining the node is a reducible node, and
when the first probability value is lower than the second probability value, determining the node is an irreducible node.

5. The method of claim 1, wherein presenting for display the modified representation of the unstructured text further comprises:
generating, by a topic generating model, summaries for each determined segment and sub-segment of the of the unstructured text; and
generating the modified representation of the unstructured text as a table of contents using the generated summaries.

6. The method of claim 5, further comprising:
receiving a first user input selecting an entry in the table of contents for the unstructured text;
presenting a first summary of the entry, the first summary including second summaries for one or more sub-entries of the entry;
receiving a second user input selecting one of the second summaries; and
presenting a portion of the unstructured text corresponding to the selected second one of the second summaries.

7. The method of claim 1, wherein child nodes of the hierarchically segmented tree structure having a same parent node represent sentences that are topically related.

8. A non-transitory computer-readable medium storing executable instructions, which when executed by a processing device, cause the processing device to perform operations comprising:
receiving unstructured text, the unstructured text including a sequence of sentences;
generating, by a neural network, a hierarchically segmented tree structure representing the unstructured text, the tree structure comprising tree structure nodes, wherein a leaf node of the tree structure nodes represents a sentence from the sequence of sentences;
determining segments and sub-segments of the unstructured text based on node data for the tree structure nodes of the hierarchically segmented tree structure; and
presenting for display a modified representation of the unstructured text based on the determined segments and sub-segments of the unstructured text.

9. The non-transitory computer-readable medium of claim 8, wherein the operation of generating the hierarchically segmented tree structure representing the unstructured text further comprises:
converting the hierarchically segmented tree structure representing the unstructured text from a binarized tree structure by:
identifying reducible nodes in the binarized tree structure, wherein reducible nodes do not represent a sentence from the sequence of sentences, and
for each reducible node, removing the reducible node and connecting direct descendants of the reducible node with a direct parent node of the reducible node.

10. The non-transitory computer-readable medium of claim 9, wherein the operation of generating the hierarchically segmented tree structure representing the unstructured text further comprises:

generating, using a text encoder, feature vectors for each sentence of the sequence of sentences;

generating, using a recurrent neural network, contextualized feature vectors using the generated feature vectors;

predicting a structure of the binarized tree structure; and labeling each node of a plurality of nodes in the binarized tree structure as a reducible node or an irreducible node.

11. The non-transitory computer-readable medium of claim 10, wherein the operation of labeling each node of the plurality of nodes in the binarized tree structure as a reducible node or an irreducible node further comprises:

for each node in the binarized tree structure:
determining a first probability value that a node is a reducible node and a second probability value that a node is an irreducible node,
when the first probability value is greater than the second probability value, determining the node is a reducible node, and
when the first probability value is lower than the second probability value, determining the node is an irreducible node.

12. The non-transitory computer-readable medium of claim 8, wherein the operation of presenting for display the modified representation of the unstructured text further comprises:

generating, by a topic generating model, summaries for each determined segment and sub-segment of the of the unstructured text; and generating the modified representation of the unstructured text as a table of contents using the generated summaries.

13. The non-transitory computer-readable medium of claim 12, storing instructions that further cause the processing device to perform operations comprising:

receiving a first user input selecting an entry in the table of contents for the unstructured text;

presenting a first summary of the entry, the first summary including second summaries for one or more sub-entries of the entry;

receiving a second user input selecting one of the second summaries; and presenting a portion of the unstructured text corresponding to the selected second one of the second summaries.

14. The non-transitory computer-readable medium of claim 8, wherein child nodes of the hierarchically segmented tree structure having a same parent node represent sentences that are topically related.

15. A system comprising:
a memory component; and
a processing device coupled to the memory component, the processing device to perform operations comprising:
receiving unstructured text, the unstructured text including a sequence of sentences;
generating, by a neural network, a hierarchically segmented tree structure representing the unstructured text, the tree structure comprising tree structure nodes, wherein a leaf node of the tree structure nodes represents a sentence from the sequence of sentences;
determining segments and sub-segments of the unstructured text based on node data for the tree structure nodes of the hierarchically segmented tree structure; and presenting for display a modified representation of the unstructured text based on the determined segments and sub-segments of the unstructured text.

16. The system of claim 15, wherein the operation of generating the hierarchically segmented tree structure representing the unstructured text further comprises:

converting the hierarchically segmented tree structure representing the unstructured text from a binarized tree structure by:
identifying reducible nodes in the binarized tree structure, wherein reducible nodes do not represent a sentence from the sequence of sentences, and
for each reducible node, removing the reducible node and connecting direct descendants of the reducible node with a direct parent node of the reducible node.

17. The system of claim 16, wherein the operation of generating the hierarchically segmented tree structure representing the unstructured text further comprises: generating, using a text encoder, feature vectors for each sentence of the sequence of sentences;

generating, using a recurrent neural network, contextualized feature vectors using the generated feature vectors;

predicting a structure of the binarized tree structure; and labeling each node of a plurality of nodes in the binarized tree structure as a reducible node or an irreducible node.

18. The system of claim 17, wherein the operation of labeling each node of the plurality of nodes in the binarized tree structure as a reducible node or an irreducible node further comprises:

for each node in the binarized tree structure:
determining a first probability value that a node is a reducible node and a second probability value that a node is an irreducible node,
when the first probability value is greater than the second probability value, determining the node is a reducible node, and
when the first probability value is lower than the second probability value, determining the node is an irreducible node.

19. The system of claim 15, wherein the operation of presenting for display the modified representation of the unstructured text further comprises:

generating, by a topic generating model, summaries for each determined segment and sub-segment of the of the unstructured text; and generating the modified representation of the unstructured text as a table of contents using the generated summaries.

20. The system of claim 19, wherein the processing device performs further operations comprising:

receiving a first user input selecting an entry in the table of contents for the unstructured text;

presenting a first summary of the entry, the first summary including second summaries for one or more sub-entries of the entry;

receiving a second user input selecting one of the second summaries; and presenting a portion of the unstructured text corresponding to the selected second one of the second summaries.

* * * * *